United States Patent [19]

Plate et al.

[11] 4,016,949

[45] Apr. 12, 1977

[54] HYDROSTATIC LOAD SENSITIVE REGENERATIVE STEERING SYSTEM

[75] Inventors: John R. Plate; Charles P. Heisig, both of Milwaukee, Wis.

[73] Assignee: Allis-Chalmers Corporation, Milwaukee, Wis.

[22] Filed: Nov. 24, 1975

[21] Appl. No.: 634,892

[52] U.S. Cl. .................................. 180/160; 60/384
[51] Int. Cl.² ......................................... B62D 5/06
[58] Field of Search .......... 180/146, 154, 155, 156, 180/157, 158, 159, 160, 161, 162, 163; 60/384

[56] References Cited

UNITED STATES PATENTS

| | | | |
|---|---|---|---|
| 3,497,032 | 2/1970 | Schott | 180/160 |
| 3,528,521 | 9/1970 | Ellis | 180/160 |
| 3,587,235 | 6/1971 | Goff | 60/384 |
| 3,915,253 | 10/1975 | Ott | 60/384 X |

*Primary Examiner*—Joseph F. Peters
*Assistant Examiner*—R. Schrecengost
*Attorney, Agent, or Firm*—Arthur L. Nelson

[57] ABSTRACT

A control valve operated by the steering wheel to selectively connect a variable displacement pump for operating a hydraulic cylinder in each of two directions to steer the vehicle. The hydrostatic system is regenerative in steering of the hydraulic cylinder in one direction since both sides of the hydraulic cylinder are connected to the high pressure input line in steering in one direction. A pilot line is connected to the valve output to sense load pressure and feed back to the compensator of the variable displacement pump to vary the displacement in response to load demands of the hydrostatic system.

10 Claims, 6 Drawing Figures

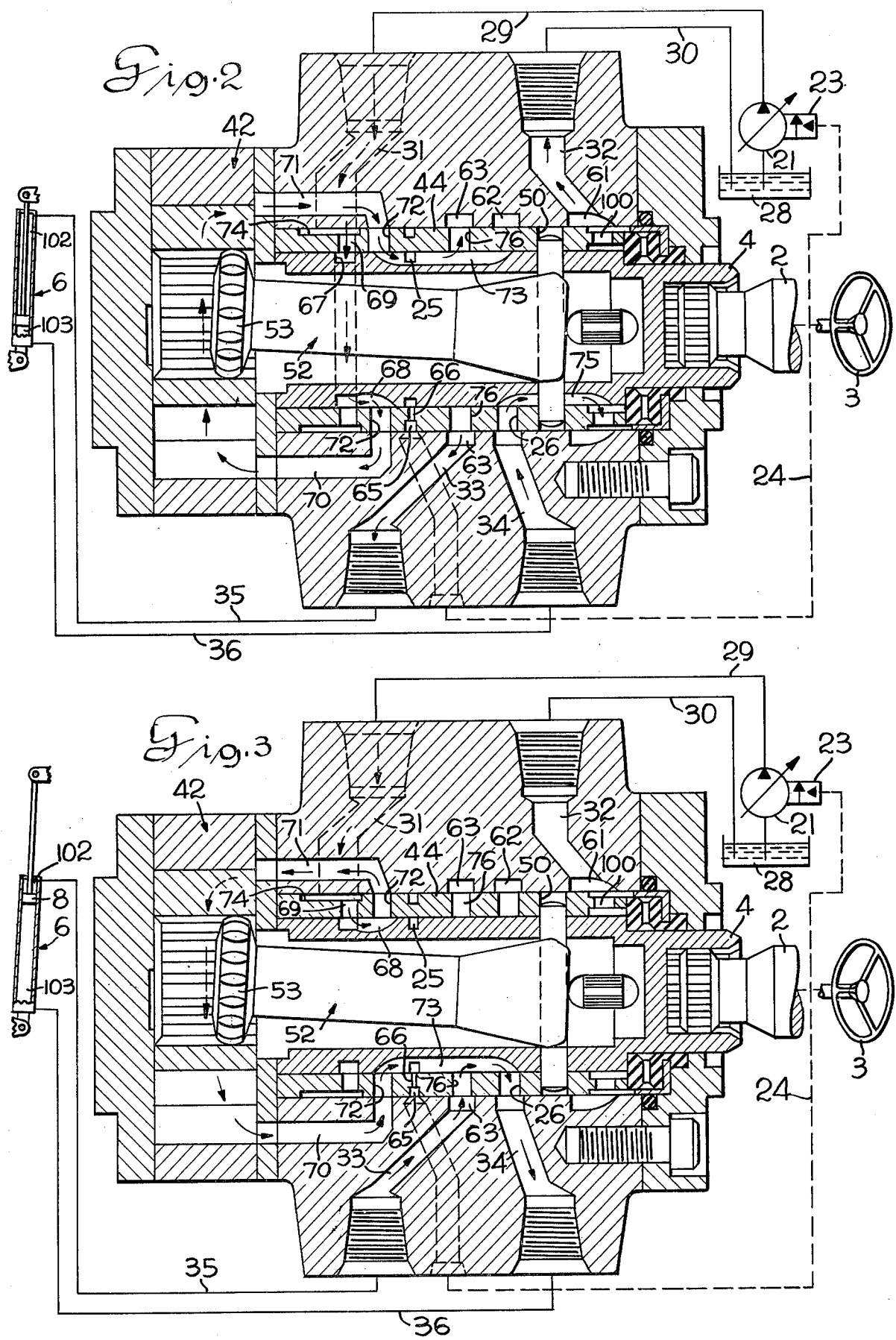

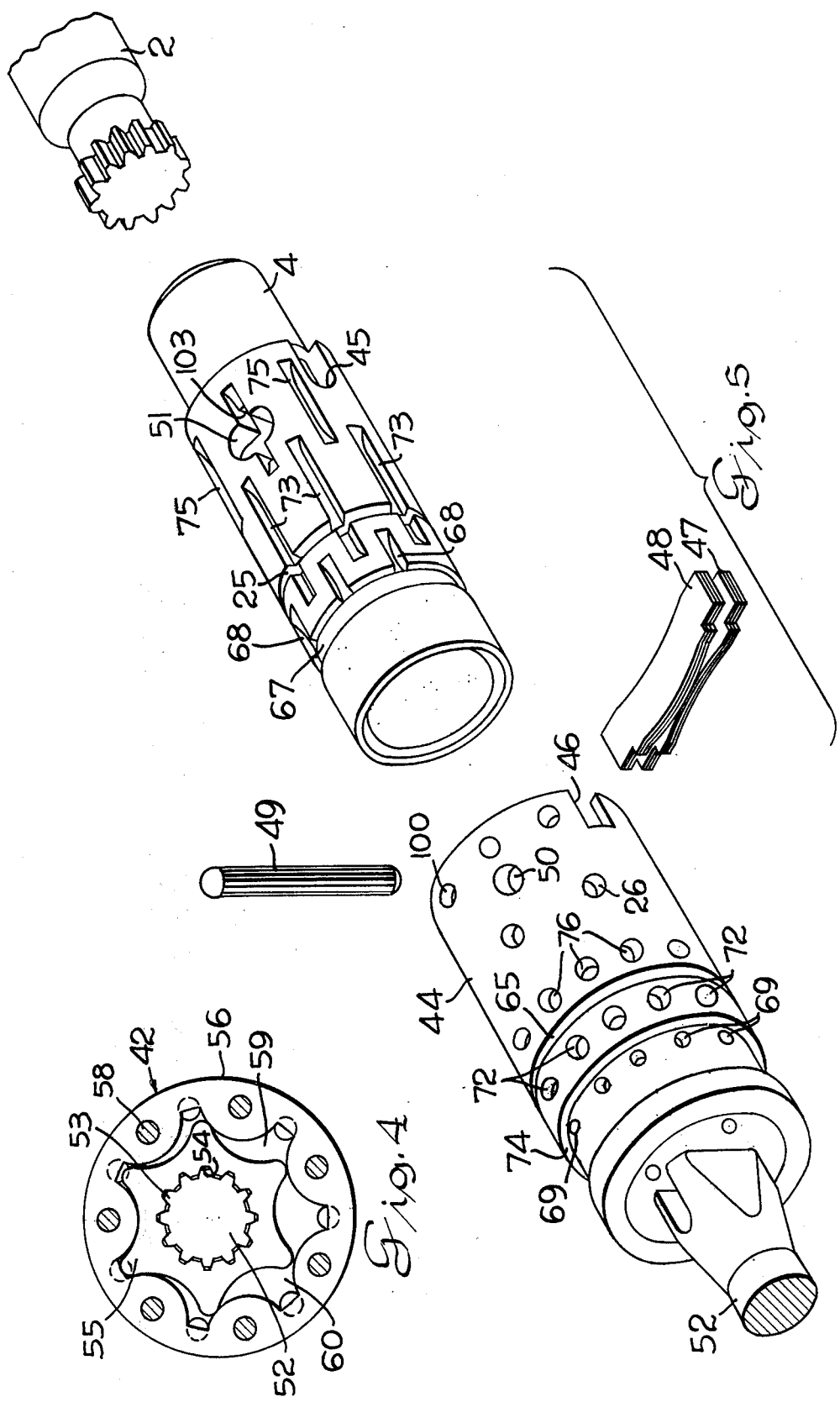

HYDROSTATIC LOAD SENSITIVE REGENERATIVE STEERING SYSTEM

This invention relates to a hydrostatic steering system and, more particularly, to a regenerative load sensitive hydrostatic steering system in which the control valve is operated in response to movement of the steering wheel. The hydraulic fluid flowing through the control valve is metered to assure the rate of steering of the front wheels is proportional to the angular rotation of the steering wheel.

With the increase in size of farm tractors, the use of hydraulic systems to perform the various functions required of the modern farm tractor has increased. The open center hydraulic system has been used quite extensively on tractors to operate hydraulic systems. The open center system allows hydraulic fluid to flow through the system continuously, even though no work is being done by any of the hydraulic actuators in the system. The closed center system, however, interrupts the flow through the hydraulic system when no work is being done by any of the hydraulic actuators. The load requirements of the system are sensed through pilot lines and the load pressure is then applied to a compensator to vary the displacement of the pump in accordance with the load demands of the various hydraulic actuators in the system. Since the closed center system has the advantage of not circulating hydraulic fluid through the system when it is not needed thereby saving energy, this system has become increasingly popular in the field of hydraulics. Although auxiliary hydraulic systems have been used on tractors which use a main hydraulic system to accomplish the operations of the implements used on the tractor, it is more economical to use only one source of pressurized fluid. Accordingly, this invention uses such a hydraulic system in which the steering of the vehicle is operated in the same hydraulic system. The control valve operated by the steering wheel selectively opens the valve to apply pressurized fluid to the hydraulic actuator to move the tie rod in one direction or the other. Since the hydraulic actuator used in this system is a single rod hydraulic cylinder, the base and rod are connected between the front axle and the tie rod to provide steering in each of the two directions depending upon the connection of the ports in the control valve which is operated by the steering wheel. The system is regenerative in steering of the vehicle in the one direction. In the opposite direction, the hydraulic fluid returning from the hydraulic actuator is discharged to sump. The load is sensed in the hydraulic steering valve as the hydraulic fluid is directed to the hydraulic steering actuator. The pilot line sensing the load pressure applies the pressure to the compensator of the variable displacement pump to assure adequate pressure to operate the steering system.

It is an object of this invention to provide a hydrostatic regenerative steering system for a motor vehicle selectively sensing load in the steering valve.

It is another object of this invention to provide a closed center hydrostatic regenerative steering circuit with load sensing in the control valve.

It is a further object of this invention to provide a hydrostatic steering valve in a hydrostatic steering system with load sensing in the valve to vary the displacement of the pump in response to load requirements in the hydrostatic system.

It is a further object of this invention to provide a closed center hydrostatic steering system with load sensing in the valve for controlling the displacement of the pump in response to load requirements of the hydraulic actuator for steering the vehicle.

It is a further object of the invention to provide a hydrostatic regenerative steering system whereby a pilot line senses a pressure in the valve proportional to load requirements in the hydraulic actuator for steering the vehicle.

The objects of this invention are accomplished by a hydrostatic steering system for a motor vehicle. A single rod hydraulic cylinder is positioned between the tie rod and the front axle to steer the front wheels. A control valve operated by the steering wheel supplies hydraulic fluid which is metered in the valve to provide steering in either right-hand or left-hand direction in response to the angular displacement of the steering wheel. The hydrostatic steering system is regenerative in steering of the vehicle in one direction by applying pressurized fluid to both ends of the hydraulic cylinder. The pilot line is connected to the valve to sense the load pressure applied to the hydraulic cylinder. The pilot line leads to the compensator of the variable displacement pump and strokes and destrokes the pump in response to load demands of the hydraulic system. Accordingly, the hydrostatic valve meters the flow of hydraulic fluid through the valve and selectively connects the pump to the desired passages leading to the hydraulic actuator for steering of the vehicle in proportion to the angular rotation of the steering wheel in either of two directions.

Referring to the drawings, the preferred embodiments of this invention are illustrated:

FIG. 2 is a cross-section view of the control valve in the right-turn position;

FIG. 3 is a cross-section view of the control valve in the left-turn position;

FIG. 4 is a cross-section view taken on line IV—IV of FIG. 1;

FIG. 5 is an exploded view of the inner portion of the control valve; and

Figure 1:
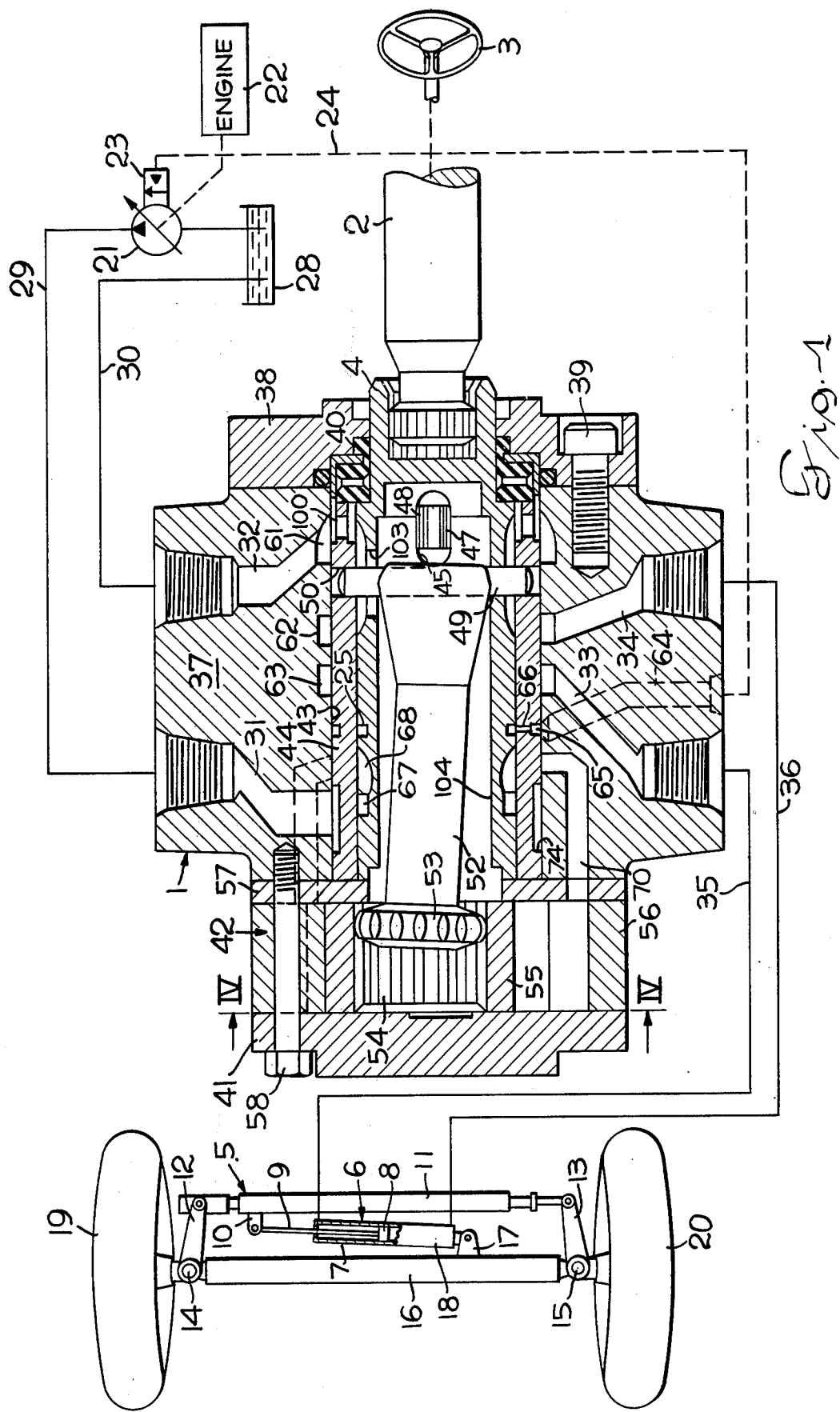
FIG. 1 illustrates a hydrostatic steering system with the steering mechanism for the steered wheels and the steering wheel and control valve with the hydrostatic system schematically illustrated. A cross-section of the control valve is also illustrated.

Referring to the drawings, the preferred embodiment of this invention is illustrated. The load pressure is sensed in the control valve as the pressurized fluid is applied to the hydraulic actuator for steering the vehicle.

FIG. 1 illustrates the steering control valve 1 operated by the input shaft 2 connected to the steering wheel 3. The input shaft 2 is connected to the commutator sleeve 4 by a spline connection between the shaft 2 and sleeve 4.

A control valve 1 controls a steering mechanism 5 which includes the hydraulic actuator 6. The hydraulic actuator 6 includes the cylinder 7 receiving a piston 8 connected to a rod 9. The rod 9 has a cross-sectional area equal to one-half the cross-sectional area of the piston 8. The rod 9 is connected to the bracket 10 mounted on the tie rod 11. The tie rod 11 is connected between the steering arms 12 and 13 on the king pins 14 and 15, respectively. The front axle 16 supports the bracket 17 which carries the base end 18 of the hydraulic actuator 6. The front wheels 19 and 20 are steered by the steering linkage 5.

The hydraulic pump 21 is driven by the engine 22. The hydraulic pump 21 is variable displacement pump with a compensator 23 mounted on the pump operating in response to pressure sensed in the control valve. The pilot line 24 transmits the sensed load pressure in the valve 1. The compensator 23 is a conventional stroking and destroking mechanism responsive to sensed pressure by the pilot line. The pump 21 displaces fluid to the high pressure line 29. The pump 21 receives supply fluid from the reservoir 28. The reservoir line 30 returns fluid from the valve to the reservoir 28.

The control valve 1 forms a high pressure chamber passage 31 and a reservoir passage 32. The hydraulic actuator 6 is connected through the hydraulic actuator passage 33 and the hydraulic actuator passage 34. The hydraulic actuator passage 33 supplies fluid to the hydraulic actuator 6 through the conduit 35. The hydraulic actuator passage 34 supplies hydraulic fluid to the hydraulic actuator 6 through the conduit 36.

The valve housing 37 includes an end plate 38 which is fastened to the housing 37 by a plurality of bolts 39 of which one is shown. The end plate 38 supports the commutator sleeve 4 which embraces the seal 40 which encircles the commutator sleeve. The end plate 41 is fastened on the left-hand of the housing 37 and encloses the metering unit 42.

The housing 37 is formed with a central opening 43 which receives the valve sleeve 44. The valve sleeve 44 receives the commutator sleeve 4. The commutator sleeve 4 is provided with a slot 45 in its end which adjoins the slot 46 in the valve sleeve 44. A pair of laminated springs 47 and 48 extend radially through the slots 45 and 46 and transmits a rotating force from commutator sleeve 4 to the valve sleeve 44 as the input shaft is rotated. The resilience of the pair of springs 47 and 48 allow angular displacement of the commutator sleeve 4 relative to the valve sleeve 44.

The pin 49 extends through a diametrical opening 50 in the valve sleeve 44. The pin 49 also extends through the elongated diametrical opening 51 of the commutator sleeve 4 which allows for the maximum angular displacement of the sleeves during the operation. The wobble shaft 52 has a bifurcated end which receives the pin 49. The wobble shaft 52 is formed with a gear 53 on the opposite end which is received in the splined opening 54 in the star wheel 55 of the metering unit 42. The star wheel 55 rotates within the stator 56 which is mounted between the end plate 41 and the spacer 57 on the housing 37.

FIG. 4 shows a cross-section view showing the stator 56 and the plurality of bolts 58 fastening the end plate 41, a stator 56 and the spacer 57 on the housing 37 of the valve. The star wheel 55 rotates within the stator 56 to meter the fluid as it flows into the expanding chamber 59 while it is flowing out of the contracting chamber 60 and vice versa as the star wheel 55 rotates within the stator 56. This provides a metering of the fluid as it flows through the valve.

The housing 37 is formed with annular recess 61 in communication with the return passage 32. The annular recess 62 is in communication with hydraulic passage 34 while the annular recess 63 in the housing 37 is in communication with the hydraulic actuator passage 33. Similarly, the annular recess 74 in the sleeve 44 is in communication with the high pressure inlet passage 31 from the pump 21.

The pilot passage 64 is in communication with the annular recess 65 in the valve sleeve 44. The vent 66 extends through the valve sleeve 44 for selectively sensing load pressures in the annular groove 25 communicating with the hydraulic passages 73 connected to the actuator 6 when the vehicle is steering in either the right or left position.

The commutator sleeve 4 is formed with an annular groove 67 in its outer periphery. The annular groove 67 is also in communication with the axial slots 68 which are in communication with a high pressure passage 31 through ports 69 in valve sleeve 44. High pressure fluid coming in the inlet passage 31 flows through the annular recess 74 and ports 69 through passages 70 or 71 to the metering unit. The fluid returns through the outlet metering passage 71 or 70 to the port 72 in the valve sleeve 44. An axial slot 73 is in communication with the port 72 which receives the high pressure fluid from the metering unit 42. The annular recess 62 or 63 in the housing receives pressurized fluid from the port 26 and the slot 73. The hydraulic actuator passage 33 is in communication with the commutator slot 73 in left or right turn position. In the regenerative position or left turn position shown in FIG. 3, slot 73 is also in communication through port 26 to actuator passage 34.

FIG. 2 shows the right-turn position in which the pressurized fluid is supplied to the hydraulic actuator passage 33 to the rod end of the hydraulic actuator 6. Hydraulic fluid from the base end of the hydraulic actuator 6 is returned through passage 34. Hydraulic fluid returns through the passage 34 and goes into the port 26 in the valve sleeve 44 and into the axial commutator slot 75 in the commutator sleeve 4 and through port 100 in valve sleeve 44 and the annular recess 61 to return passage 32.

The operation of the system will be described in the following paragraphs.

Figure 6:
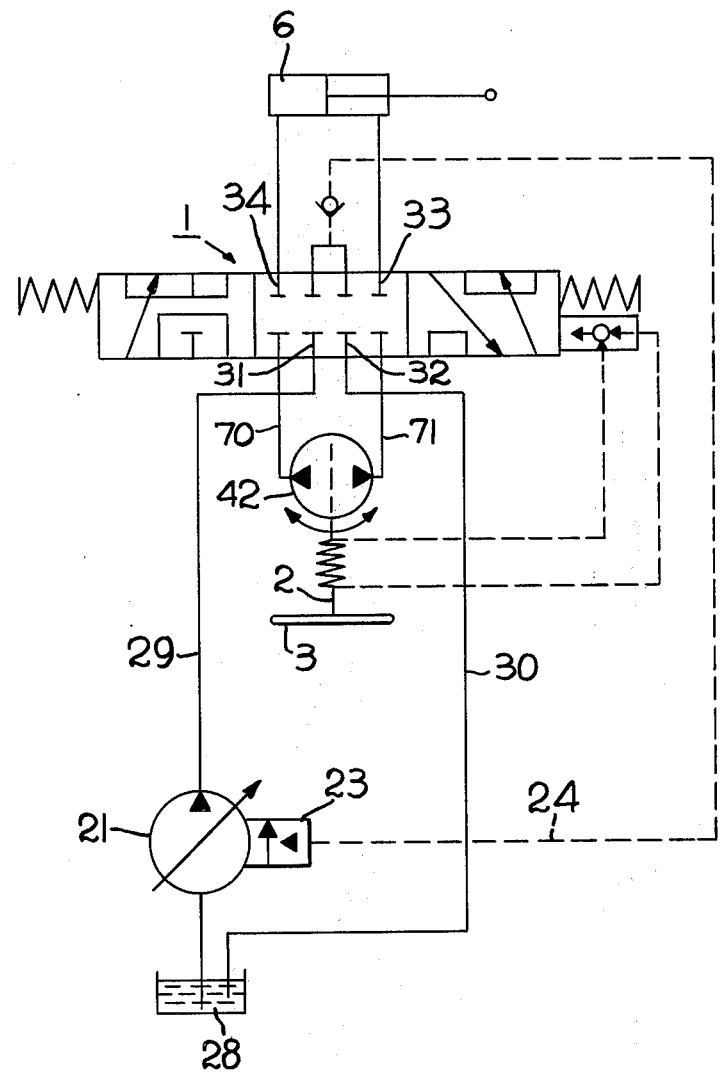
FIG. 6 is a schematic illustration of the hydrostatic system with the control valve schematically illustrated.

FIG. 6 illustrates the hydraulic system schematically FIG. 1 shows the valve in the neutral position as shown in FIG. 6. In the neutral position, the pump 21 is described with no fluid flowing through the control valve 1. When the valve is in the neutral position as shown in FIG. 1, hydraulic fluid is unable to flow through the valve sleeve 44 and the commutator sleeve 4 to the metering unit 42. The steering wheel 3 is in the neutral position and the front wheels 19 and 20 are steered to the straight ahead position. The hydraulic actuator 6 contains hydraulic fluid and the fluid is unable to pass from the hydraulic actuator 6 through the valve 1 since the passages 33 and 34 are blocked.

When the steering wheel 3 is steered in the right-turn position, the control valve 1 is steered to a position as shown in FIG. 2. Pressurized fluid flows through the passage 31 into the annular recess 74 and through the port 69. The hydraulic fluid then flows through the annular groove 67, the axial slots 68 and radially outwardly through the one set of ports 72 and passage 70 to the metering unit 42. Fluid flowing into the metering unit 42 and selectively flows into one of the expansible chambers 59 as the volume is increasing in this selective chamber. Simultaneously one of these chambers 60 is decreasing in volume and the fluid flows out of the chamber 60 decreasing in volume and flows into the passage 71 and back into the valve. As the fluid flows back into the valve, it then flows radially inwardly through the other set of ports 72 and the slot 73. The fluid then flows radially outward through the ports 76 into annular recess 63. Fluid then flows through the passage 33, conduit 35 to the rod end chamber 102 of the hydraulic actuator 6. Simultaneously fluid flows from the base end chamber 103 of hydraulic actuator 6 and returns through the conduit 36 and passage 34. Hydraulic fluid then passes through the port 26, the slot 75, port 100 to the annular recess 61, and flows through the return passage 32 and conduit 30 to the reservoir 28. Sensing of the pressure signal is through the annular groove 25 which intersects slot 73 and communicates with the annular groove 65 and port 66 which is in communication with the pilot line 24 which supplies the pressure signal to the compensator 23.

When the vehicle is steered in the left-hand direction, the steering wheel is rotated to rotate the input shaft 2 and the commutator sleeve 4 as shown in FIG. 3. This allows pressurized fluid from the pump output to flow through the conduit 29 and the high pressure passage 31 through the annulus 74 and port 69. The pressurized fluid flowing through the port 69 then flows through the slots 68 and radially outward through one set of port 72 into passage 71. The pressurized fluid in the passage 71 then flows through the metering unit 42 and returns through the passage 70 to the other set of ports 72. Pressurized fluid in the port 72 enters the slot 73. Pressurized fluid flowing through the commutator slot 73 then flows radially outward through the port 26 and the hydraulic actuator passage 34 into conduit 36. Pressurized fluid flowing into the base end chamber 103 moves the piston 8 toward the rod end chamber 102. Pressurized fluid in the rod end chamber 102 is forced out of the conduit 35 since the pressurized fluid in the base end chamber 103 acts against a surface on the piston which is equal to twice the area exposed to pressurized fluid in the rod end chamber 102. The pressurized fluid flowing through the conduit 35 then flows through the passage 33 and returns to the annulus 63 and into the port 76. The slot 73 is in communication with the annular groove 25 and the vent 66. Pressurized fluid in the slot 73 is then sensed by the pump through annulus 65 and passage 64 and the pilot line 24 by the compensator 23. No hydraulic fluid is returned to reservoir in this position. The control valve is in a regenerative position. The displacement of the hydraulic actuator operates so that the piston moves an equal distance in each direction for unit metered fluid through the metering unit 42. Accordingly, when the steering wheel is steered in the right-hand or the left-hand direction, the wheels are steered an equal amount for an equal angular rotation of the wheel since the fluid metered to either side of the piston in hydraulic actuator 6 is the same.

The embodiments of the invention in which an exclusive property or privilege is claimed are defined as follows:

1. A regenerative hydraulic steering system for a motor vehicle comprising, a variable displacement pump having a pressure compensator for controlling the displacement of the pump responsive to a sensed load pressure, a control valve including a housing defining inlet passage for connection to the pump, a return passage for connection to a reservoir, and actuator passages, a hydraulic actuator for connection to a steering linkage to steer a motor vehicle, said hydraulic actuator including a piston with a rod connected to said piston extending from said hydraulic actuator defining a rod end hydraulic chamber and a base end hydraulic chamber, an actuator conduit connecting the rod end chamber to an actuator passage in said control valve and an actuator passage connecting the base end chamber of said hydraulic actuator to a second actuator passage in the control valve, said control valve including an input shaft adapted for operation by a steering wheel, a commutator sleeve connected to said input shaft adapted for movement in a first direction when said steering wheel is rotated in one direction and for movement in a second direction when said steering wheel is rotated in the other direction, a valve sleeve received in said housing and receiving said commutator sleeve, a metering unit positioned in said valve housing for metering fluid flowing through said control valve, passage means connecting said control valve to and from said metering unit, said commutator sleeve and said valve sleeve defining a plurality of passageways selectively connecting said inlet passage through said metering unit to said actuator passages for regenerative operation and connecting said inlet passage to one of said actuator passages through the metering unit and connecting the other actuating passage to the return passage for non-regenerative operation, said input shaft causing displacement of said commutator sleeve relative to said valve sleeve when said input shaft is rotated in either of said two directions, said displacement between said sleeves selectively connecting said passageways in said commutator sleeve and valve sleeve in said control valve for selective connection of said valve through said metering unit to said hydraulic actuator to selectively extend and contract said hydraulic actuator for steering of the motor vehicle, said commutator sleeve and valve sleeve defining a sensing passage in communication with said passageways for sensing a pressure signal when said variable displacement pump is connected to said hydraulic actuator through said control valve, a pilot line connecting said sensing passage in said control valve to said compensator for selectively sensing load pressures in said control valve to vary the displacement of the pump in response to the sensed pressure.

2. A regenerative hydraulic power steering system as set forth in claim 1 wherein said pilot line senses the load pressure in said sensing passage adjacent one of said actuator passages of said control valve.

3. A regenerative hydraulic power steering system for a motor vehicle as set forth in claim 1 including, a vehicle axle and a tie rod and steering arm, said hydraulic actuator including means connecting said hydraulic actuator between the vehicle axle and the tie rod and steering arm of said steering linkage.

4. A regenerative hydraulic power steering system for a motor vehicle as set forth in claim 1 wherein said passageways include a regenerative slot connecting both of said actuator passages and said sensing passage simultaneously for regenerative operation.

5. A regenerative hydraulic power steering system for a motor vehicle as set forth in claim 1 wherein said sensing passage in said passageway senses pressure in said control valve upstream from said actuator passages and proportional to the load pressure in said hydraulic actuator.

6. A regenerative hydraulic power steering system for a motor vehicle as set forth in claim 1 wherein said control valve includes means for rotating said commutator sleeve relative to said valve sleeve to provide communication between said pump and said hydraulic actuator.

7. A regenerative hydraulic power steering system for a motor vehicles set forth in claim 1 including resilient means for normally positioning said commutator sleeve and said valve sleeve in a neutral position interrupting communication from said pump to said hydraulic actuator.

8. A regenerative hydraulic power steering system as set forth in claim 1 wherein said pilot line for sensing pressure applied to said compensator includes means defining an annular recess and a port in said valve sleeve for sensing pressure in said control valve.

9. A regenerative hydraulic power steering system for a motor vehicle as set forth in claim 1 wherein said sensing passage senses a pressure in said control valve between said inlet passage and said actuator passages.

10. A regenerative hydraulic power steering system for a motor vehicle as set forth in claim 1 wherein said metering unit includes a plurality of expansible chambers for selective expansion and contraction of said chambers to meter fluid through said control valve for applying fluid to said hydraulic actuator to control the rate of displacement of said hydraulic actuator in direct proportion to the angular rotation of said input shaft connected to said commutator sleeve.

* * * * *